(12) United States Patent
Chen et al.

(10) Patent No.: US 10,848,040 B2
(45) Date of Patent: Nov. 24, 2020

(54) ELECTRICAL POWER GENERATING SYSTEM

(71) Applicant: Grand Power Energy Technology Co., Ltd., Taoyuan (TW)

(72) Inventors: Chao-Huang Chen, Taoyuan (TW); Kuang-Chin Chen, Taoyuan (TW)

(73) Assignee: GRAND POWER ENERGY TECHNOLOGY CO., LTD., Taoyuan (TW)

( * ) Notice: Subject to any disclaimer, the term of this patent is extended or adjusted under 35 U.S.C. 154(b) by 23 days.

(21) Appl. No.: 16/200,668

(22) Filed: Nov. 27, 2018

(65) Prior Publication Data

US 2020/0127545 A1 Apr. 23, 2020

(30) Foreign Application Priority Data

Oct. 22, 2018 (TW) .............................. 107137198 A

(51) Int. Cl.
*H02K 21/24* (2006.01)
*H02K 19/38* (2006.01)
(Continued)

(52) U.S. Cl.
CPC ........... *H02K 19/38* (2013.01); *H02K 1/2793* (2013.01); *H02K 21/24* (2013.01); *H02K 19/28* (2013.01); *H02K 19/365* (2013.01); *H02P 1/16* (2013.01)

(58) Field of Classification Search
CPC ...... H02K 1/2793; H02K 16/00; H02K 53/00; H02K 21/24; H02K 19/38
(Continued)

(56) References Cited

U.S. PATENT DOCUMENTS

| 4,186,312 A * | 1/1980 | Dvorak | ................... F03B 15/06 290/4 R |
| 4,498,014 A | 2/1985 | Reyes | |

(Continued)

FOREIGN PATENT DOCUMENTS

| CN | 102017364 A | 4/2011 |
| CN | 204652204 U | 9/2015 |

(Continued)

OTHER PUBLICATIONS

English machine translation, Yamashita JP 11022628 A (Year: 1999).*

*Primary Examiner* — Burton S Mullins
(74) *Attorney, Agent, or Firm* — Cheng-Ju Chiang

(57) ABSTRACT

This present disclosure discloses an electrical power generating system, comprising a mechanical energy input, a direction transferring module, a first electromagnetic rotation module, a second electromagnetic rotation module and a power storage module. The direction transferring module is connected with the mechanical energy input. Moreover, the direction transferring module comprises a first output and a second output. The first output and the second output are deposed on two sides of the direction transferring module respectively. The first electromagnetic rotation module is connected with the first output, and the second electromagnetic rotation module is connected with the second output. On the other hand, the power storage module connects to the first electromagnetic rotation module and the second electromagnetic rotation module simultaneously.

8 Claims, 8 Drawing Sheets

(51) Int. Cl.
*H02K 1/27* (2006.01)
*H02K 19/28* (2006.01)
*H02K 19/36* (2006.01)
*H02P 1/16* (2006.01)

(58) Field of Classification Search
USPC ........ 290/3, 4 R, 4 C, 47, 50; 74/664, 665 F, 74/665 GA, 665 GB, 665 GC; 310/112, 310/113
See application file for complete search history.

(56) References Cited

U.S. PATENT DOCUMENTS

| | | | |
|---|---|---|---|
| 4,684,813 A * | 8/1987 | Watson | H02P 9/00 |
| | | | 290/4 A |
| 5,808,450 A * | 9/1998 | Chula | H02K 3/04 |
| | | | 315/160 |
| 7,309,938 B1 | 12/2007 | Smith | |
| 7,517,264 B2 * | 4/2009 | Carr | B63H 23/06 |
| | | | 440/75 |
| 8,138,695 B2 * | 3/2012 | Kissane | H02K 53/00 |
| | | | 318/139 |
| 8,664,794 B2 * | 3/2014 | Bitar | F03D 1/025 |
| | | | 290/55 |
| 8,836,158 B2 * | 9/2014 | Cho | H02P 9/04 |
| | | | 290/55 |
| 9,561,763 B2 * | 2/2017 | Klemen | H02P 5/60 |
| 9,812,937 B2 * | 11/2017 | Chen | H02K 21/24 |
| 2008/0236332 A1 * | 10/2008 | Hoose | F16H 31/001 |
| | | | 74/810.1 |
| 2014/0114523 A1 | 4/2014 | Hirasawa et al. | |
| 2015/0180309 A1 | 6/2015 | Klemen et al. | |
| 2016/0301295 A1 | 10/2016 | Regier et al. | |
| 2017/0175701 A1 | 6/2017 | Barrett | |
| 2017/0267493 A1 * | 9/2017 | Takahashi | H02K 1/278 |
| 2018/0097432 A1 * | 4/2018 | Chen | H02K 3/47 |

FOREIGN PATENT DOCUMENTS

| | | | | |
|---|---|---|---|---|
| GB | 917912 A | | 2/1963 | |
| JP | S56-43264 U | | 4/1981 | |
| JP | S58-119733 A | | 7/1983 | |
| JP | H11-22628 A | | 1/1999 | |
| JP | 2001-355567 A | | 12/2001 | |
| JP | 2003-231893 A | | 8/2003 | |
| JP | 3193838 U | | 10/2014 | |
| KR | 10-1687815 B1 | | 12/2016 | |
| KR | 10-2017-0089622 A | | 8/2017 | |
| TW | 201716261 A | | 5/2017 | |
| TW | M579483 U | | 6/2019 | |
| WO | 2004005760 | * | 1/2004 | ........... F16H 49/005 |
| WO | 2013/069500 A1 | | 5/2013 | |

* cited by examiner

ELECTRICAL POWER GENERATING SYSTEM

TECHNICAL FIELD

The present disclosure relates to an electrical power generating system, more particularly to an electrical power generating system having a direction transferring module for converting mechanical energy to electrical energy.

DESCRIPTION OF THE RELATED ART

In human civilization, electromagnetic induction is the first basic principle used by humans to generate electrical energy. Electromagnetic induction refers to a conductor placed in a varying magnetic flux that generates an electromotive force. This electromotive force is called as an induced electromotive force or an induced electromotive force.

If the abovementioned conductor is closed in a loop, the electromotive force drives the electrons to flow so as to form an induced current (induced current). Historically, Michael Faraday found that the electromotive force generated on a closed loop is proportional to the rate of change of magnetic flux through any curved surface surrounded by the path. In other words, when the magnetic flux of the curved surface surrounded by the conductor changes, current will flow within the closed conductor.

The principles mentioned above are applicable when the magnetic field changes per se or when the conductor relatively moves to the magnetic field. Therefore, electromagnetic induction is the basic technology for the operation of generators, induction motors, transformers, and most other electrical equipment.

With the evolution of the times, there have been quite a lot of solutions for changing the magnetic field or relative motion. However, how to effectively convert mechanical energy into electrical energy and to improve its conversion efficiency has always been an issue that needs to be improved.

SUMMARY

The above summary of the present disclosure is to provide a basic description of the various aspects and features of a present disclosure. It is not a detailed description. Its purpose is not to specifically recite keys or critical elements of the present disclosure, and it is not intended to limit the scope of the present disclosure. It merely presents a few concepts of the present disclosure in a concise manner.

In one aspect, an electrical power generating system includes a mechanical energy input source, a direction transferring module, a first electromagnetic rotation module, a second electromagnetic rotation module, and a power storage module.

The direction transferring module connects to the mechanical energy input source, and the direction transferring module includes a first output and a second output respectively arranged at two lateral sides of the direction transferring module.

The first electromagnetic rotation module connects to the first output of the direction transferring module, and the second electromagnetic rotation module connects to the second output of the direction transferring module.

The power storage module connects to both of the first electromagnetic rotation module and the second electromagnetic rotation module.

The above summary of the present disclosure relates to provide a basic description of the various aspects and features of the invention. The invention is not to be construed as being limited to the details of the present disclosure.

DESCRIPTION OF THE PREFERRED EMBODIMENTS

To clarify the purpose, technical solutions, and the advantages of the disclosure, embodiments of the present disclosure will now be described more fully hereinafter with reference to the accompanying drawings.

Figure 1:
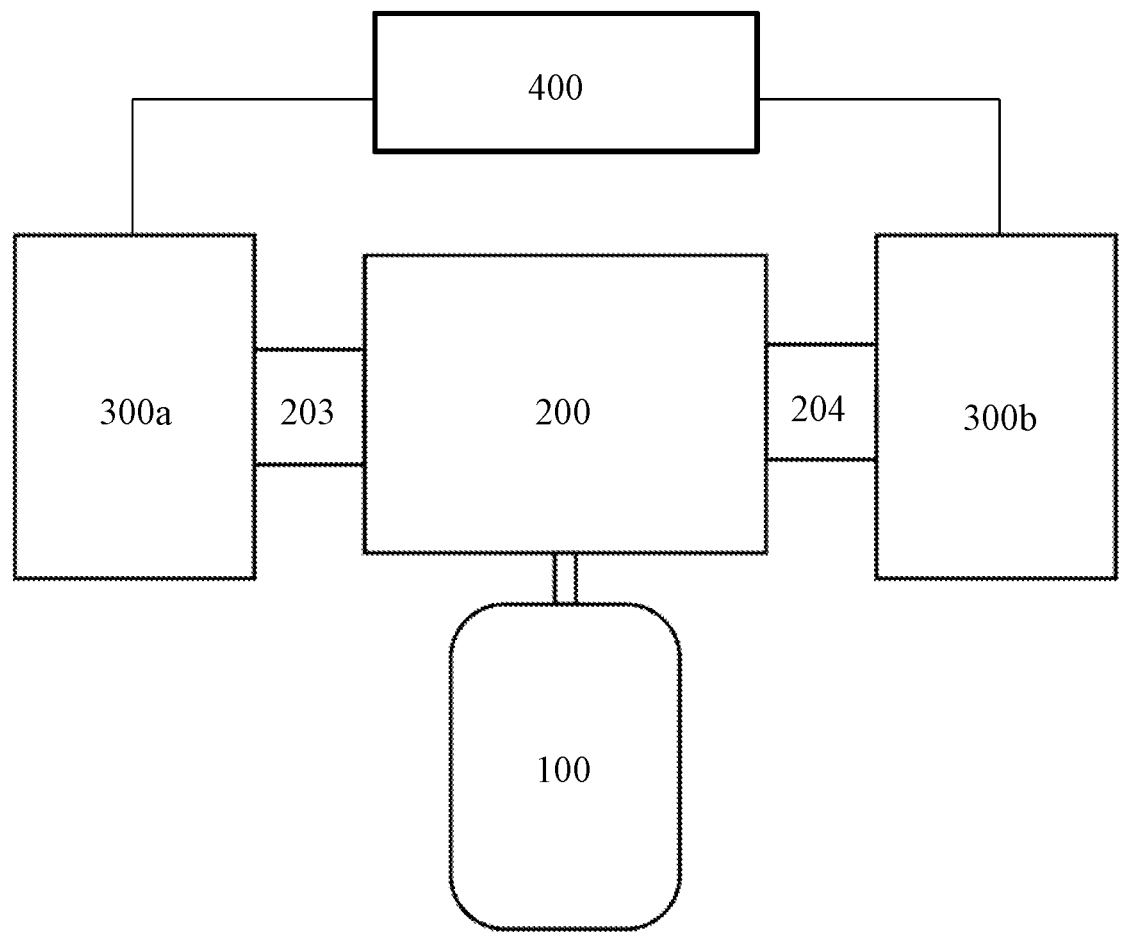
FIG. 1 is a block diagram of the electrical power generating system in accordance with one embodiment of the present disclosure.
Figure 2:
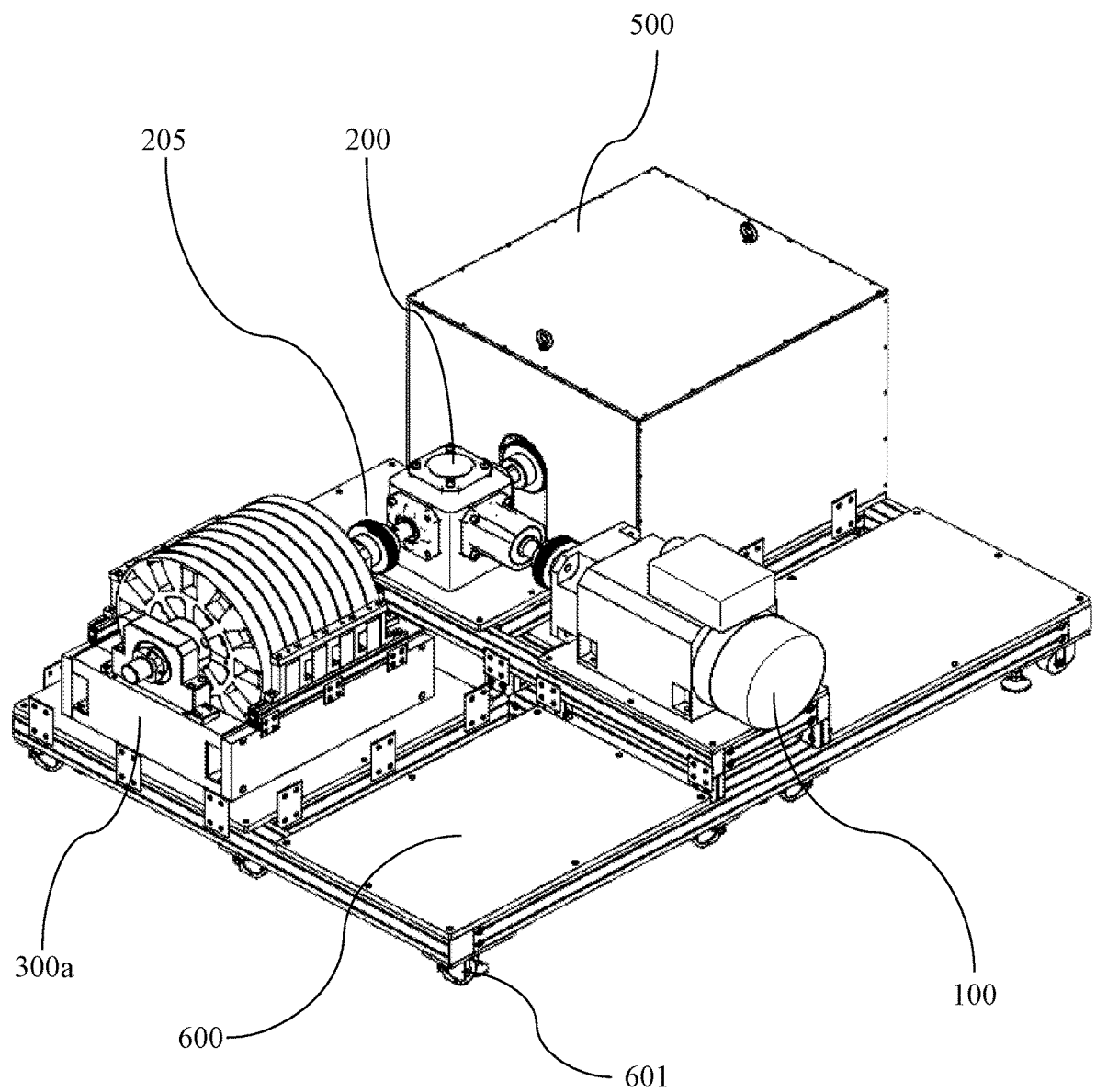
FIG. 2 is a schematic view showing the electrical power generating system in accordance with one embodiment of the present disclosure.

FIG. 1 is a block diagram of the electrical power generating system in accordance with one embodiment of the present disclosure. FIG. 2 is a schematic view showing the electrical power generating system in accordance with one embodiment of the present disclosure. As shown in FIG. 1, the electrical power generating system 10 includes a mechanical energy input source 100, a direction transferring module 200, a first electromagnetic rotation module 300a, a second electromagnetic rotation module 300b, and a power storage module 400.

The direction transferring module 200 connects to the mechanical energy input source 100, and the direction transferring module 200 includes a first output 203 and a second output 204 respectively arranged at two lateral sides of the direction transferring module 200.

The first electromagnetic rotation module 300a connects to the first output 203, and the second electromagnetic rotation module 300b connects to the second output 204. The power storage module 400 connects to both of the first electromagnetic rotation module 300a and the second electromagnetic rotation module 300b to receive the electrical energy generated by the first electromagnetic rotation module 300a and the second electromagnetic rotation module 300b. In one embodiment, the power storage module 400 may be a battery pack having a battery, such as a lithium battery or a lithium-ion battery, or a device capable of receiving electrical energy, such as a super capacitor, which is not limited by the present disclosure. Further, the system architecture diagram in FIG. 1 can be actually implemented into the structure shown in FIG. 2.

As shown in FIG. 2, the mechanical energy input source 100 may be a synchronous servo motor configured to improve the operation efficiency of the electrical power generating system 10. The power storage module 400 may connect to the mechanical energy input source 100 (not shown). The mechanical energy input source 100 can be replaced by any mechanical structure capable of generating mechanical energy, including a fan turbine set of wind power generation, a turbine set of hydroelectric power, a rotary mechanical structure driven by a boiler, and any device capable of providing mechanical energy.

In addition, as shown in FIG. 2, the second electromagnetic rotation module 300b is covered by a cover 500. In an example, the first electromagnetic rotation module 300a and the second electromagnetic rotation module 300b may be covered by the cover 500. The cover 500 is not only configured to maintain the appearance, but also may be designed as an insulating material to further prevent leakage. In addition, in consideration of noise during mechanical operation, the cover 500 can also be mixed with a soundproof material to reduce the noise generated during operation. In FIG. 2, the top of the cover 500 may be, but not limited to, further provided with two lifting rings for convenient hanging during the installation work.

The electrical power generating system 10 is arranged on a base 600, and a bottom of the base 600 includes a plurality of rollers 601 pro. In an example, the base 600 includes a plurality of platforms being fixed together. A plurality of rollers 601 are disposed at the bottom of each platform. Each platform can carry a single component of the electrical power generating system 10 (e.g., only the first electromagnetic rotating module 300a). Accordingly, the electrical power generating system 10 may be arbitrarily disassembled and combined through the base 600 to achieve modularization.

Figure 3:
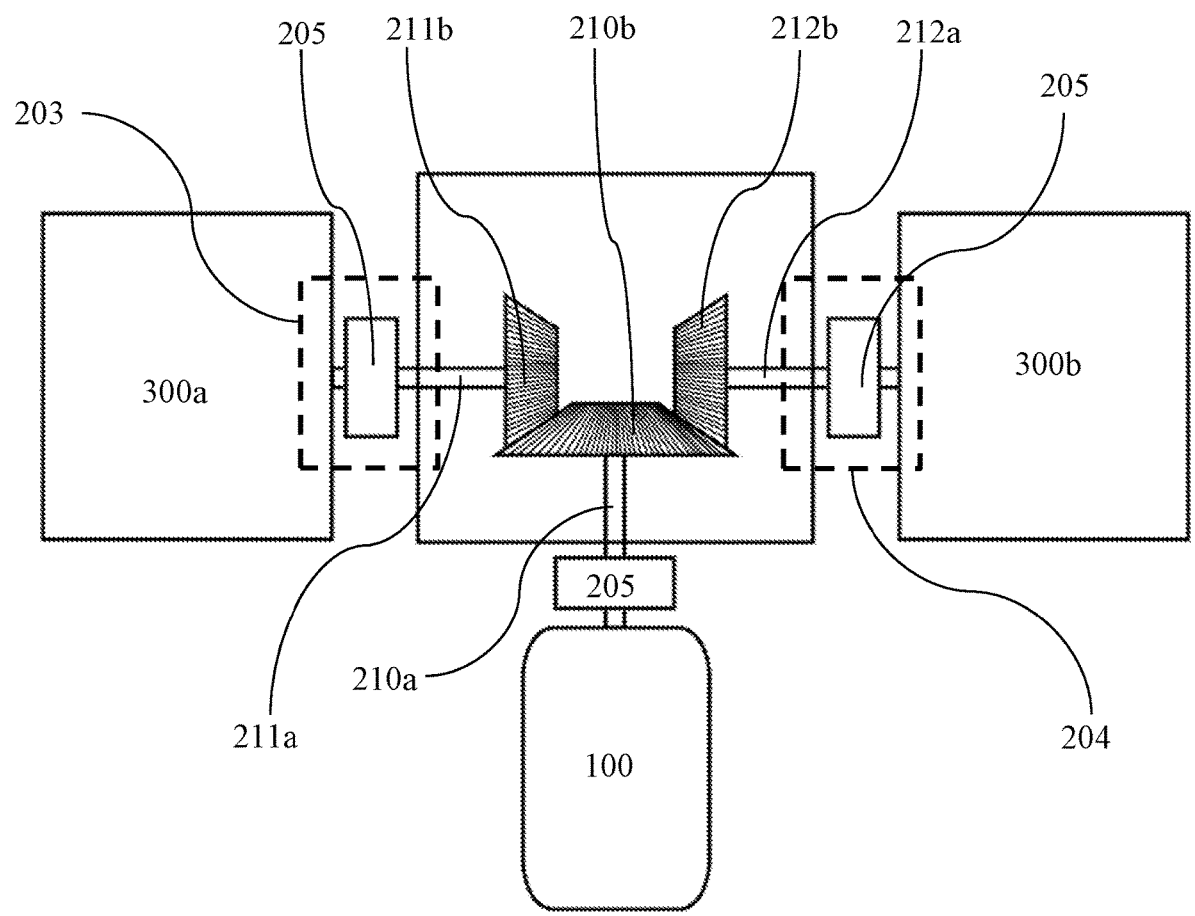
FIG. 3 is a schematic view of the direction transferring module in accordance with one embodiment of the present disclosure.

As shown in FIG. 2, the direction transferring module 200 is implemented with a cross diverter. Furthermore, the cross diverter must achieve the steering effect demanded by the direction transferring module 200 in a manner that changes the direction of operation of the mechanical energy. FIG. 3 is a schematic view of the direction transferring module in accordance with one embodiment of the present disclosure. As shown in FIG. 3, the cross diverter of the direction transferring module 200 may include a main shaft 210a, a main gear 210b, a first gear 211b, a first steering shaft 211a, a second gear 212b, and a second steering shaft 212a.

The main shaft 210a connects to the mechanical energy input source 100, the main gear 210b connects to the main shaft 210a, the first gear 211b is meshed with the main gear 210b, the first steering shaft 211a connects to the first gear 211b, the second gear 212b is meshed with the main gear 210b, and the second steering shaft 212a connects to the second gear 212b.

In FIGS. 2 and 3, the direction transferring module 200 is implemented by the cross diverter, and thus a coupler 205 is configured between the first electromagnetic rotation module 300a, the second electromagnetic rotation module 300b, and the mechanical energy input source 100. Thus, the first output 203 in FIG. 1 is substantially the same with the first steering shaft 211a and the coupler 205 in FIGS. 2 and 3. In addition, the second output 204 in FIG. 1 is substantially the same with the second steering shaft 212a and the coupler 205 in FIGS. 2 and 3.

In the embodiment, the cross diverter of the direction transferring module 200 may include the main gear 210b, the first gear 211b, and the second gear 212b made of alloy steel SNCM220, and are fully subjected to carburization hardening to make the hardness satisfying the requirement of Rockwell Hardness C (RC) 56. Also, the main shaft 210a, the first steering shaft 211a, and the second steering shaft 212a are made of SCM440 steel, and are subject to tempering process so as to meet the heavy torque demand caused by rotation.

Figure 4:
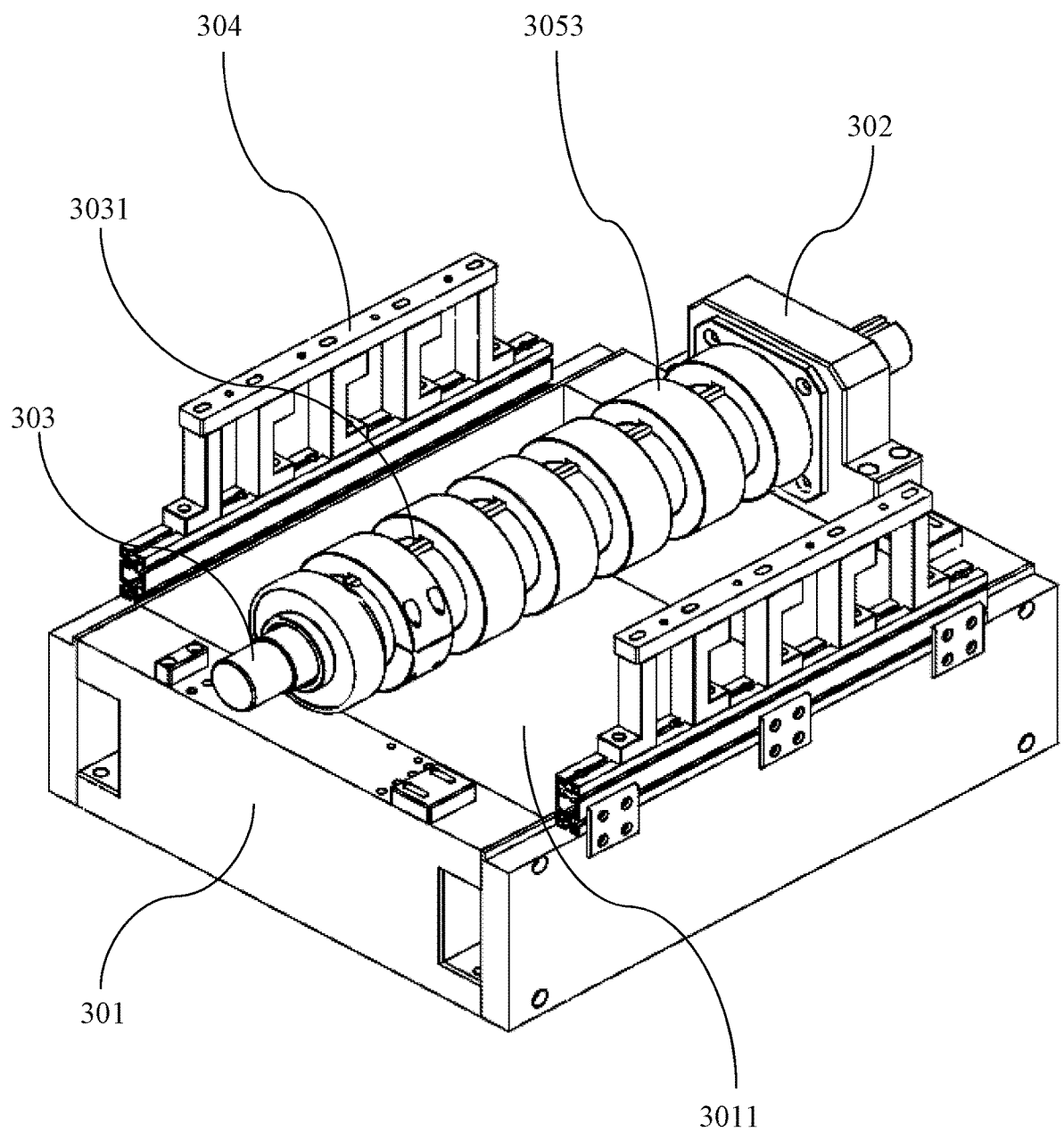
FIG. 4 is a schematic view of the electromagnetic rotation module in accordance with one embodiment of the present disclosure.

FIG. 4 is a schematic view of the electromagnetic rotation module in accordance with one embodiment of the present disclosure. The electromagnetic rotation module in FIG. 4 may be the first electromagnetic rotation module 300a or the second electromagnetic rotation module 300b in FIG. 2. In an example, when the electromagnetic rotation module in FIG. 4 is the first electromagnetic rotation module 300a in FIG. 2. The first electromagnetic rotation module 300a includes a supporting mechanism 301, two rotating shaft fixing mechanisms 302, a central shaft 303, two disk fixing mechanisms 304, and an electric disk body module 305.

The supporting mechanism 301 includes four edges, and the four edges constitute a containing space 3011, and the two rotating shaft fixing mechanisms 302 are configured on two opposite sides of the four edges of the supporting mechanism 301. Referring to FIGS. 1 and 2, the central shaft 303 passes through the rotating shaft fixing mechanisms 302 and connects to the first output 203 or the second output 204. The two disk fixing mechanisms 304 are configured on the other two sides of the four edges of the supporting mechanism 301. The central shaft 303 passes through the electric disk body module 305, and the electric disk body module 305 is partially fixed on the disk fixing mechanisms 304.

Figure 8:
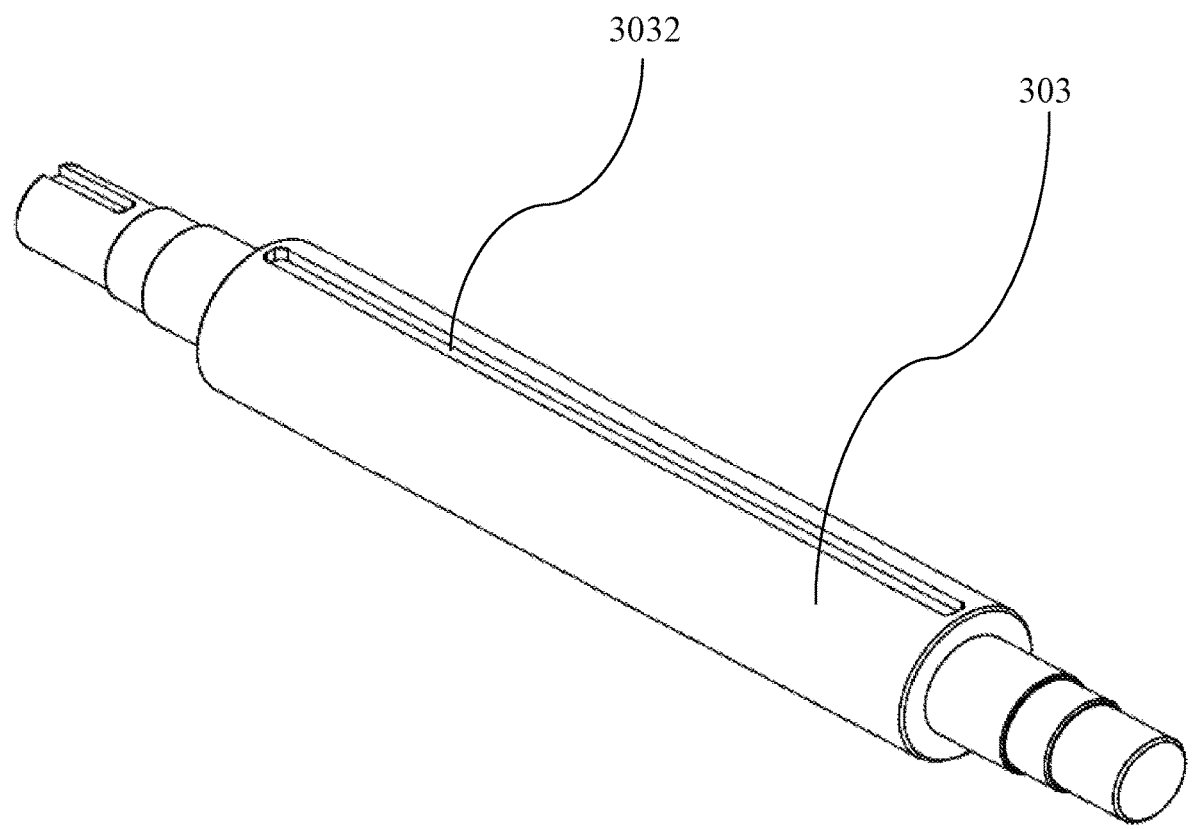
FIG. 8 is a schematic view of a central axis in accordance with one embodiment of the present disclosure.

In FIG. 4, the central shaft 303 is configured with a strip-shaped rib 3031. In another example, the strip-shaped rib 3031 may be a strip-shaped groove 3032, as shown in FIG. 8.

Figure 5:
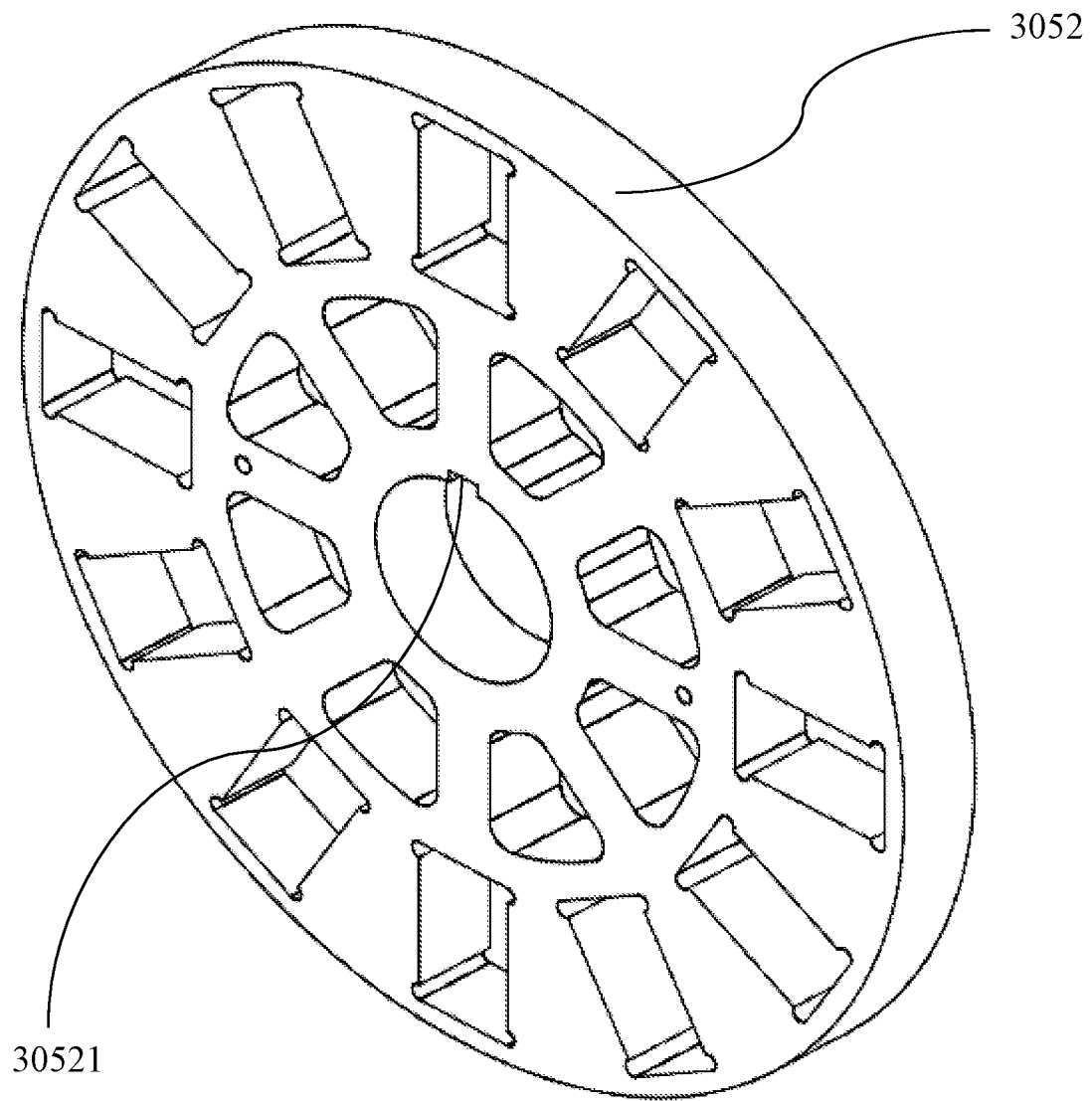
FIG. 5 is a schematic view of the disk in accordance with one embodiment of the present disclosure.
Figure 6:
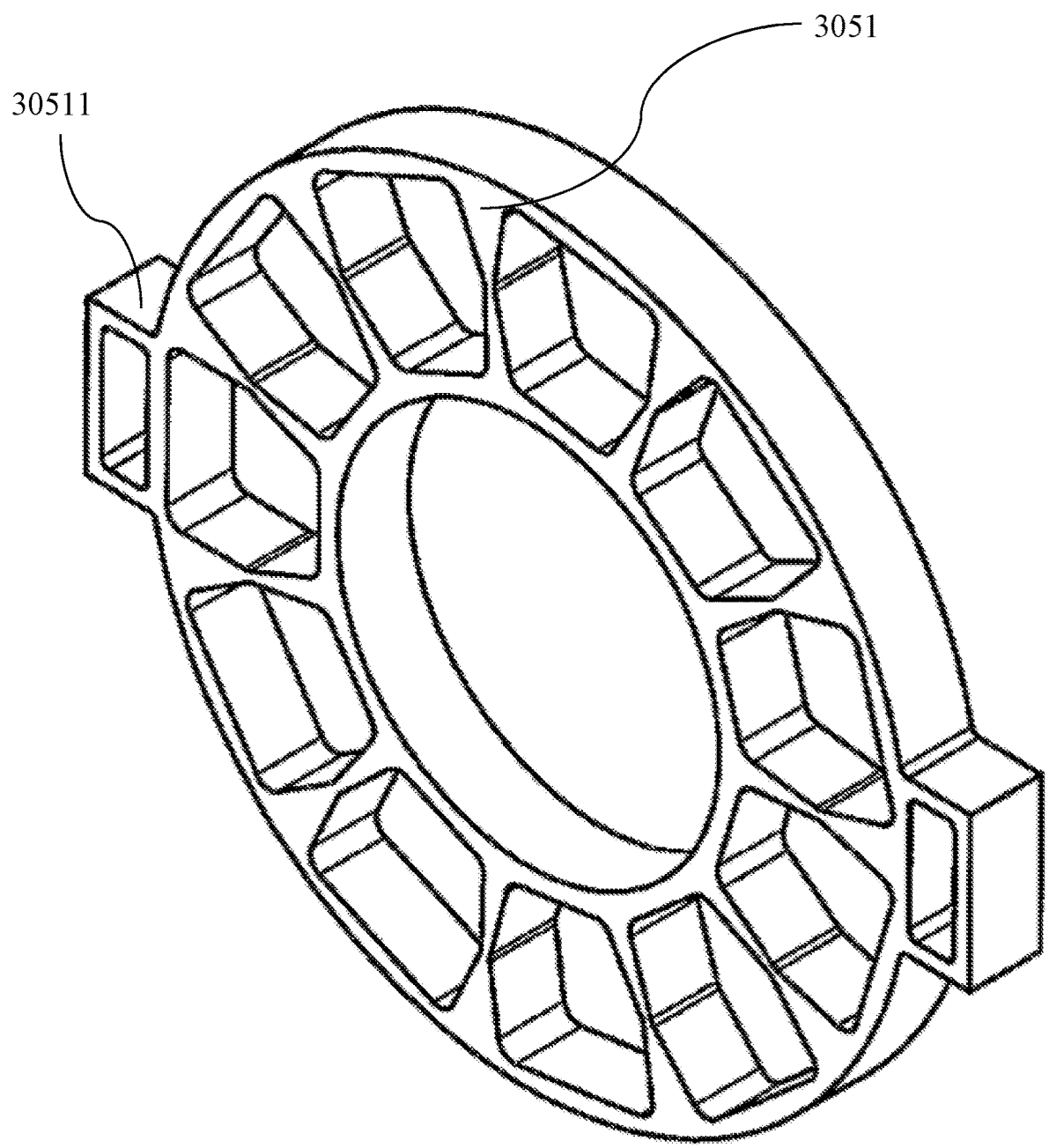
FIG. 6 is a schematic view of the circle disk in accordance with one embodiment of the present disclosure.
Figure 7:
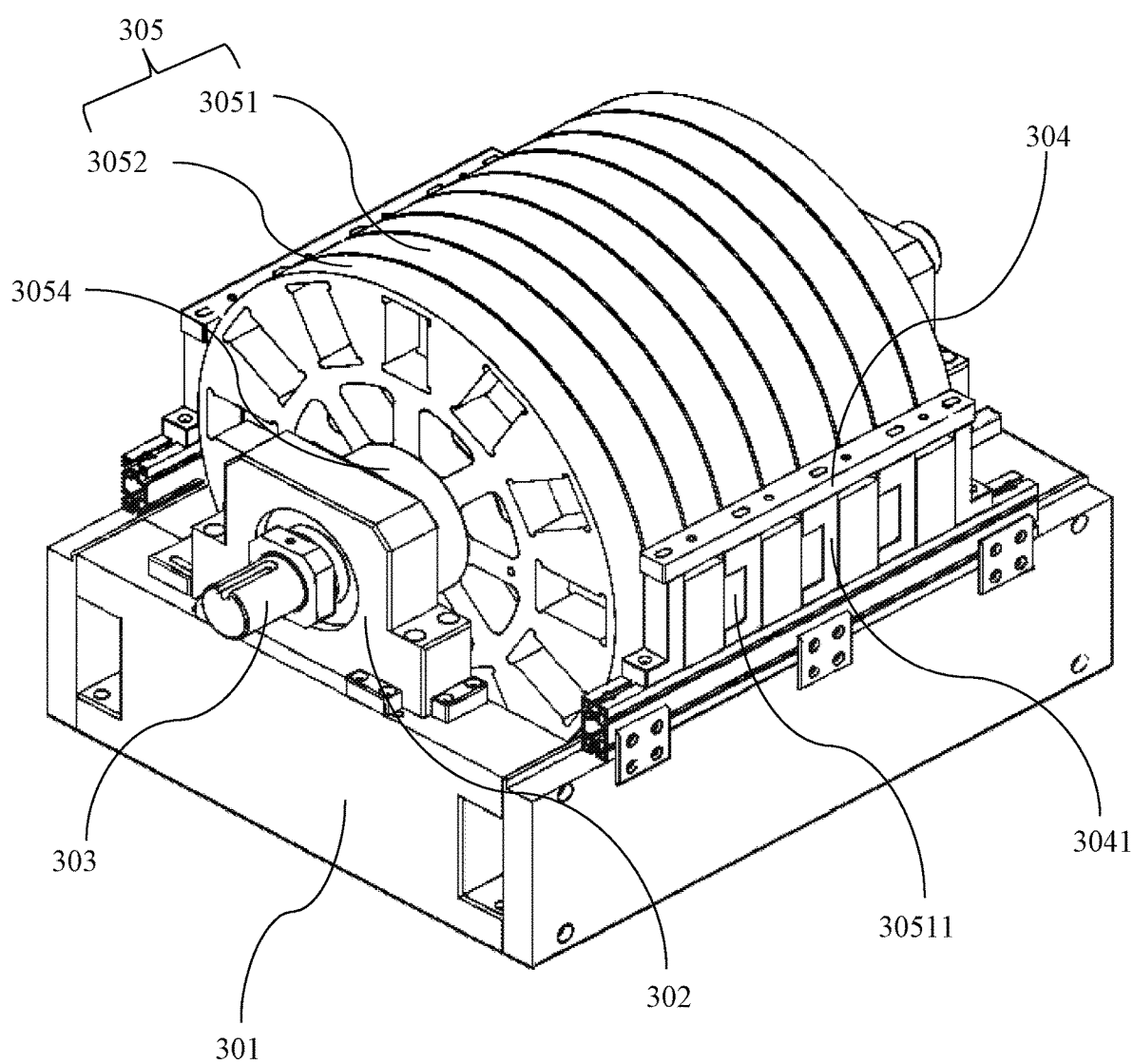
FIG. 7 is a schematic view showing the structure of the electromagnetic rotation module in accordance with one embodiment of the present disclosure.

FIG. 5 is a schematic view of the disk in accordance with one embodiment of the present disclosure. FIG. 6 is a schematic view of the circle disk in accordance with one embodiment of the present disclosure. FIG. 7 is a schematic view showing the structure of the electromagnetic rotation module in accordance with one embodiment of the present disclosure.

Referring to FIGS. 4-7, a plurality of bearings 3053 of the electric disk body module 305 are spaced apart from each other on the central shaft 303. In addition, the bearings 3053 are configured with notches corresponding to the strip-shaped rib 3031 so as to fix the bearings 3053 on the central shaft 303. In FIG. 8, as the central shaft 303 is configured with a plurality of strip-shaped grooves 3032, the plurality of bearings 3053 can also be configured with a plurality of clamping ribs on its inner ring, and the clamping ribs may engage with the strip-shaped grooves 3032.

As shown in FIGS. 4-7, the electric disk body module 305 may include a plurality of bearings 3053, a plurality of coil disks 3051, and a plurality of disks 3052. The central shaft 303 passes through the bearings 3053, and the bearings 3053 are configured to space apart from each other on the central shaft 303. Each of the coil disks 3051 is configured with two fixing units 30511 symmetrical to each other. Each of the coil disks 3051 are arranged on each of the bearings 3053 in sequence. Each of the disks 3052 is configured with an engaging groove 30521 or an engaging rib (not shown) respectively corresponding to the strip-shaped rib 3031 on the central shaft 303 in FIG. 4 or the strip-shaped grooves 3032 on the central shaft 303 in FIG. 8. The disks 3052 and the coil disks 3051 are alternately stacked.

As shown in FIG. 5, the disks 3052 are configured with a plurality of I-shaped holes and inverted-trapezoidal holes disposed around a center of the disk 3052, wherein the I-shaped holes are disposed on the outer ring of the disk 3052, and are evenly arranged at equal intervals. The inverted-trapezoidal holes are disposed on the inner ring of the disk 3052, and are equally arranged at equal intervals. Through the above design, in addition to effectively reducing the weight of the disks 3052, it is also possible to further configure the I-type holes and the inverted trapezoidal holes, if necessary, such as embedding a permanent magnet or changing the weight ratio thereof, so as to control the magnetic field effect.

As shown in FIG. 6, the coil disk 3051 may also be configured with a plurality of hexagonal holes around its center, and a quadrangular hole may be configured on the fixing unit 30511, thereby reducing the weight of the coil disk.

As shown in FIG. 7, the two fixing units 30511 on each coil disk 3051 are simultaneously engaged with the two disk body fixing mechanisms 304. Further, each of the disk body fixing mechanisms 304 further includes a "C"-shaped restricting member 3041. The two fixing units 30511 respectively pass through the two "C"-shaped restricting members 3041 at two lateral sides such that when the electric disk body module 305 is rotated by the central shaft 303, only a plurality of disks 3052 rotate with the central shaft 303.

In FIG. 7, in order to prevent the electric disk body module 305 from rubbing against the supporting mechanism 301 or the two rotating shaft fixing mechanisms 302, a spacer 3054 is further disposed at both ends of the center shaft 303. More precisely, the spacers 3054 disposed at the ends of the center shaft 303 are disposed at a gap between the electric disk body module 305 (more precisely, the disk 3052 as shown in FIG. 7) and the supporting mechanism 301.

Through the above mechanism, the rotating disks 3052 may result in changed in magnetic field, thereby converting the rotating mechanical energy into electrical energy. When the first electromagnetic rotation module 300a and the second electromagnetic rotation module 300b are configured, as shown in FIG. 2, the energy input by the mechanical energy input source 100 can be effectively converted into electric energy to improve the efficiency.

The above description is merely the embodiments in the present disclosure, the claim is not limited to the description thereby. The equivalent structure or changing of the process of the content of the description and the figures, or to implement to other technical field directly or indirectly should be included in the claim. All other embodiments obtained by a person of ordinary skill in the art based on the embodiments of the present disclosure without creative efforts shall fall within the protection scope of the present disclosure.

What is claimed is:

1. An electrical power generating system, comprising:
    a mechanical energy input source;
    a direction transferring module connecting to the mechanical energy input source, the direction transferring module comprising a first output and a second output respectively arranged at two lateral sides of the direction transferring module;
    a first electromagnetic rotation module connecting to the first output of the direction transferring module;
    a second electromagnetic rotation module connecting to the second output of the direction transferring module; and
    a power storage module connecting to both of the first electromagnetic rotation module and the second electromagnetic rotation module;
    wherein the first electromagnetic rotation module and the second electromagnetic rotation module each comprises:
    a supporting mechanism comprising four edges, and the four edges constituting a containing space;
    two rotating shaft fixing mechanisms being disposed on two opposite sides of the four edges of the supporting mechanism;
    a central shaft passing through the rotating shaft fixing mechanisms and connecting to the first output or the second output;
    two disk fixing mechanisms being disposed on the other two sides of the four edges of the supporting mechanism and each of the two disk fixing mechanisms comprising a C-shaped restricting member; and
    an electric disk body module being passed through by the central shaft.

2. The system as claimed in claim 1, wherein the mechanical energy input source is a synchronous servo motor.

3. The system as claimed in claim 1, wherein the direction transferring module comprises:
    a main shaft connecting to the mechanical energy input source;
    a main gear connecting to the main shaft;
    a first gear engaging with the main gear;
    a first steering shaft connecting to the first gear;
    a second gear engaging with the main gear; and
    a second steering shaft connecting to the second gear.

4. The system as claimed in claim 3, wherein the first steering shaft connects to the first electromagnetic rotation module via a first coupler, the second steering shaft connects to the second electromagnetic rotation module via a second coupler, and the main shaft connects to the mechanical energy input source via a third coupler.

5. The system as claimed in claim 1, wherein the electrical power generating system is configured on a base, and a bottom of the base is configured with a plurality of rollers.

6. The system as claimed in claim 1, wherein the central shaft further comprises a strip-shaped rib or a strip-shaped groove.

7. The system as claimed in claim 6, wherein the electric disk body module further comprises:
    a plurality of bearings are spaced apart from each other on the central shaft;
    a plurality of coil disks, each of the coil disks is configured with two fixing units symmetrical to each other, and each of the coil disks are arranged on each of the bearings in sequence;
    a plurality of disks, and each of the disks is configured with an engaging groove or an engaging rib respectively corresponding to the strip-shaped rib or the strip-shaped grooves of the central shaft, and the disks and the coil disks are alternately stacked; and
    the two fixing units are simultaneously engaged with the two C-shaped restricting members, such that only a plurality of disks rotates along with the central shaft when the electric disk body module is driven to rotate by the central shaft.

8. The system as claimed in claim 1, wherein the first electromagnetic rotation module and the second electromagnetic rotation module are respectively covered by a cover.

* * * * *